Nov. 10, 1970 R. M. WALSER ET AL 3,540,047
THIN FILM MAGNETODIELECTRIC MATERIALS
Filed July 15, 1968 5 Sheets-Sheet 1

INVENTORS
RODGER M. WALSER
RALPH J. HACH
BY
Barnes, Kisselle, Raisch & Choate
ATTORNEYS

INVENTORS
RODGER M. WALSER
RALPH J. HACH

United States Patent Office 3,540,047
Patented Nov. 10, 1970

3,540,047
THIN FILM MAGNETODIELECTRIC MATERIALS
Rodger M. Walser, Austin, Tex., and Ralph J. Hach, Fort Lauderdale, Fla., assignors to Conductron Corporation, Ann Arbor, Mich., a corporation of Delaware
Filed July 15, 1968, Ser. No. 744,742
Int. Cl. H01q 17/00
U.S. Cl. 343—18                                       40 Claims

ABSTRACT OF THE DISCLOSURE

A magnetic media that is penetrable by electromagnetic energy in a frequency range from radio frequencies up to millimeter wavelengths comprising a plurality of macroscopic thin film elements individually arranged in an orderly array and suspended in an insulating media so that all of the elements in the array have a common uniaxial anisotropy axis. Layers of thin film elements are stacked alternately with layers of insulating material. The thin film elements are nickel-iron alloys or nickel-iron-cobalt alloys, commonly known as "permalloy." The metallic, thin film elements have a thickness that is small compared with the smallest skin depth encountered in the frequency range of interest, for example, 10 mHz. to 100 gHz., and have transverse dimensions much smaller than the smallest corresponding wavelength in the frequency range of interest. By separating a thin film into discrete macroscopic elements and arranging the elements in an orderly array, either a single or a multiple layer array, certain desirable properties of a thin ferromagnetic film are retained, contrary to what might be expected, whereas the conductivity is virtually eliminated.

Ferrites now enjoy a prominent place in applications where high frequency radiation penetrates the ferrite for interaction therewith in various different ways depending upon the particular application involved. Such applications where ferrites have been used or where use is contemplated are microwave devices including resonance isolators, circulators, electronically variable phase shifters, attenuators, time delays, limiters and possibly parametric amplifiers and other devices. Ferrite devices have also found practical use at lower frequency ranges, for example, the 1–100 mHz. range, in applications requiring linear magnetic response at low flux levels, for example, inductors, impedance transformers, antenna cores, filter chokes, and magnetic control elements. However, there is an upper limit on the maximum ferrite permeability that can be obtained because the magnetic spins of the metal atoms must couple indirectly through the oxygen of the ferrite, the so-called super-exchange coupling. Hence, the gross magnetization is much smaller than that of the massive metal. On the other hand, since the metal atoms are isolated in the crystalline lattice by intervening oxygen atoms, electrical conduction and electrical losses due to eddy currents are low and hence a good ferrite is also an electrical insulator. As a consequence of this atomic structure, a ferrite is permeable to frequencies up to infrared.

Thin ferromagnetic films having thicknesses on the order of 1000 A. (angstroms), principally permalloy films, have been proposed to meet increasing demands for materials with higher permeabilities and lower losses at frequencies above 10 mHz. than could be obtained with bulk ferrite material. Such films have also been investigated in connection with magnetic storage to obtain high permeabilities at low loss in miniaturized systems. However, due to the relatively high conductivity of bulk permalloy material and thin ferromagnetic films made of permalloy material, thin films have not been considered useful at frequencies above 10 mHz.

Thin ferromagnetic films have important advantages over ferrites, particularly in connection with the intrinsic permeability and ferromagnetic resonance. The susceptibility of thin ferromagnetic films at radio frequencies is typically at least twice the order (100 times) of that of ferrites. This higher susceptibility is due to the larger magnetization and smaller crystalline anisotropy fields in thin ferromagnetic films. Also with thin films and ferrites having similar natural resonant frequencies, the static field required to establish resonance at higher frequencies is considerably less with the thin ferromagnetic films. The ferromagnetic resonance line-width in polycrystalline films lies between those for polycrystalline and single crystalline ferrites. Moreover, the $\mu Q$ product, the usual figure of merit for linear magnetic applications, is typically twice the order (100 times) larger in films than in ferrites at all RF frequencies above 10 mHz. However, as stated above, thin films cannot be used effectively for many applications due to their high conductivity.

The present invention contemplates a media penetrable by high frequency radiation and having certain desirable properties of thin ferromagnetic films without having the high DC conductivity of bulk thin films. Desired parameters of a thin film of ferromagnetic material, Permalloy, in the preferred embodiment, may first be optimized and then utilized effectively by separating the thin film into individual macroscopic elements, such as flakes, discs, wafers or the like. The thin film elements may be suspended in a dielectric layer. Also layers of thin film elements may be alternately stacked with dielectric layers to build up magnetic properties required for a given application. Thin magnetic films, for example, films less than a few kiloangstroms thick, can be naturally magnetically oriented during deposition, and will exhibit a very large volume density of uniformly oriented atomic spins without external bias; or, stated differently, the material possesses a large magnetic susceptibility. This desirable magnetic property is retained by orderly arrangement of individual discrete elements in a single or multiple layer array so that all of the elements have common uniaxial anisotropy axes.

The term "continuous" is used herein in connection with a semi-infinite thin film of the general type heretofore known whereas the terms thin film "media," thin film "array" and "magnetodielectric" are used herein in connection with the material of the present invention comprising discrete, macroscopic, thin film elements. Also as used herein, "intrinsic" refers to properties of a continuous thin film and "effective" refers to properties of a thin film array.

One important advantage of the magnetodielectrics of the present invention is that in either a single layer array or a stacked layer array, the permeability of the media is reduced from that of a continuous thin film by only the ratio of the dielectric volume to the total volume of the media. Hence by optimizing the volume fill factor of thin film in the array, permeabilities approaching those of a continuous film can be achieved. Another important advantage is that the electric susceptibility of the media is independent of the conductivity of each film element. The average or bulk permeability and permittivity of the media can be selected such that energy in the high frequency range can penetrate the magnetic material media for interaction with the media. The magnetic loss tangent can be made intentionally high while the dielectric loss tangent can be made comparatively low where such is required by a particular application at a particular frequency. On the other hand, the magnetic loss tangent can be reduced while the low dielectric loss tangent is retained where those properties are desired for a particular application at particular frequencies of interest.

For applications in which conductivity or the associated eddy current losses are not a major consideration, thin film magnetodielectrics constructed according to the present invention also overcome size limitations imposed by using continuous films wherein the usefulness of the films is limited by the skin depth at the desired operating frequency. Hence the semi-artificial media of the present invention enables miniaturization of prior art devices even where conductivity or eddy current losses, or both, would not be a serious disadvantage.

Thus an object of the present invention is to provide a thin film media that is penetrable by electromagnetic energy in a high frequency range for effective interaction with the media.

Further objects of the present invention include providing a thin film media wherein: the media possesses substantially improved magnetic properties over metal powders, ferrites and continuous thin films; the media contains a very large volume density of atomic spins available for interaction with radio frequency fields propagating in the media; the media has a large average magnetic susceptibility and exhibits ferromagnetic resonance corresponding to a continuous thin film; desirable magnetic properties of continuous ferromagnetic thin films are retained while the DC conductivity is virtually eliminated by comparison to a continuous thin film; and/or permeability and permittivity and other characteristics and properties desired for a given application can be achieved in a manner that is economically feasible.

Other objects, features and advantages of the present invention will be apparent in connection with the following description, the appended claims and the accompanying drawings in which:

Figure 1:
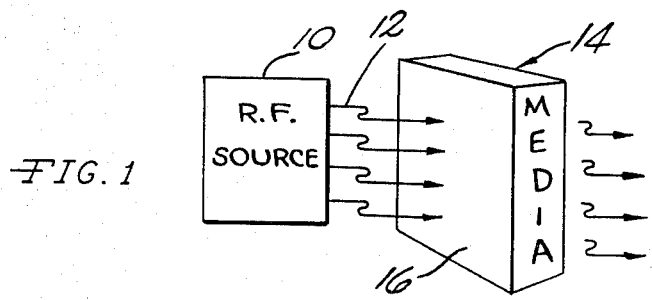
FIG. 1 is a view schematically illustrating electromagnetic radiation propagating through a thin film media of the present invention.

Referring more particularly to FIG. 1, for purposes of illustration, a source 10 is illustrated as transmitting electromagnetic radiation 12 which impinges upon a magnetic media 14. The media 14 is arranged with its front planar face 16 perpendicular to the direction of propagation of radiation 12. The radiation 12 is high frequency, in the frequency range of from 10 mHz. to 100 gHz., and media 14 is constructed according to the present invention to permit the radiation 12 to penetrate into the media for interaction therewith.

Figure 2:
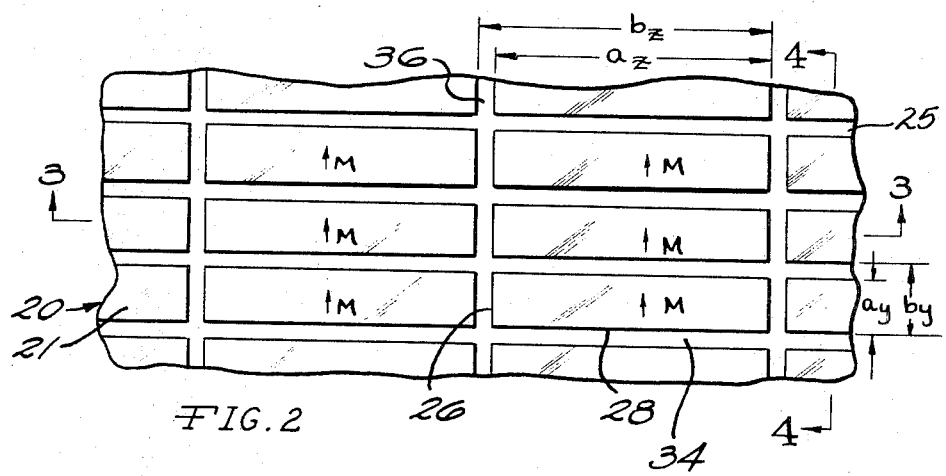
FIG. 2 is an enlarged elevational view of a fragmentary portion of the media taken in a direction of propagation.

Referring more particularly to FIG. 2, there is illustrated an enlarged fragmentary portion of the media 14 at the front face 16 thereof. The media 14 is a laminated grid-like array generally comprising layers 20 of thin metallic film elements 21 stacked alternately with layers 22 of thin dielectric elements 24 on a base substrate 25. Each of the thin metallic film elements 21 and the dielectric elements 24 are rectangular and have a short side 26 and a long side 28. Although elements 21 are rectangular in the embodiment disclosed, the thin film elements may have other geometries, such as a circular disc. However, they are preferably parallelepipeds to provide a high volume fraction of thin film to total volume, The elements 21, 24 are orderly arranged in their respective layers 20, 22 in a latticed pattern consisting of vertical columns and horizontal rows as viewed in FIG. 2. The elements 21, 24 in each layer 20, 22 are separated by a grid-like pattern of horizontal voids 34 and vertical voids 36 isolating adjacent elements in each layer. The thin film layers 20 are all of equal thickness as are the dielectric layers 22. The thin film elements in each layer 20 are stacked in vertical alignment as viewed in FIG. 3 with corresponding thin film elements in all the other layers.

Figure 3:
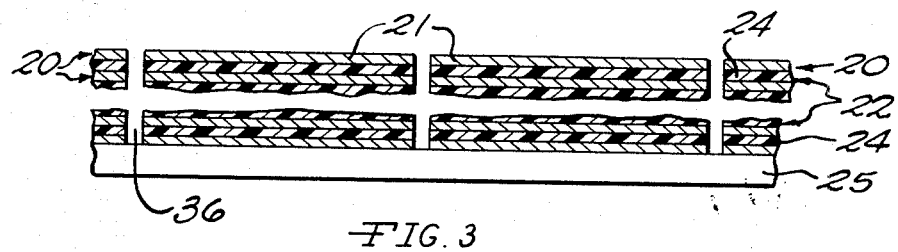
FIG. 3 is a sectional view taken on line 3—3 of FIG. 2.
Figure 5:
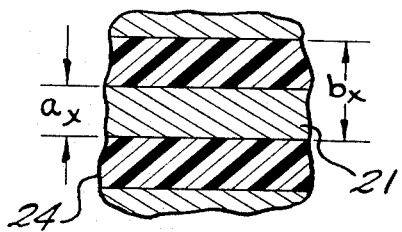
FIG. 5 is a fragmentary view of the layered media of FIG. 4 enlarged still further.
Figure 4:
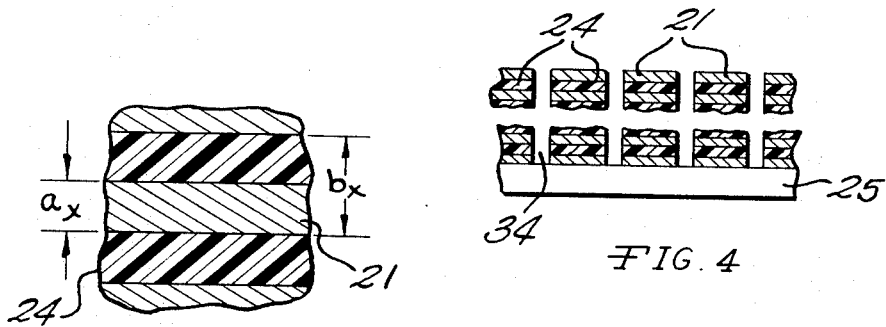
FIG. 4 is a sectional view taken on line 4—4 of FIG. 2.

Each of the thin film elements 21 is magnetically oriented during formation so that in use the element has a very large volume density of horizontally oriented atomic spins without external bias; or, stated differently, the elements 21 have large magnetic susceptibility. The easy axis of magnetization of each element 21 is illustrated by an arrow M and all of the elements 21 are arranged in the array with the same orientation of their easy axes M. Hence the easy axis dimension of the element 21 is the short side 26 and the hard axis dimension is the long side 28. The short side 26 and the long side 28 both have dimensions smaller than the smallest wavelength of radiation 12 and the thickness of each element 21, the vertical dimension as viewed in FIG. 3, is at least less than, and preferably substantially less than, the skin depth at the frequency of the radiation 12. For purposes that will later be apparent, sides 26, 28 are also designated $a_y$, $a_z$, the thickness $a_x$ and the lattice spacings are designated $b_y$, $b_z$ and $b_x$.

In the preferred embodiment of the present invention, each of the thin metallic film elements 21 is composed primarily of iron and nickel, for example, alloys of the type commonly known as and available commercially under the trade name "Permalloy," although other metallic alloys are contemplated by the present invention and particularly nickel-iron compositions and nickel-iron compositions including other constituents such as cobalt. The dielectric elements 24 may be constructed of numerous suitable materials having the characteristics desired, for example, the insulating layers may be SiO, $MgF_2$, or ZnS, although SiO is preferred. The substrate 25 is optical quality glass, although other suitable materials such as polished copper foil or high-temperature Mylar-type plastics could be used depending in part on the particular application. For microwave frequencies, the thickness of the layers or layered elements 22 would be on the order of 1000 A. or approximately $10^{-5}$ centimeters. In one specific embodiment, the short side 26 was 0.020 inch, the long side was 0.095 inch and the voids 34, 36 were 0.005 inch. The thickness of the dielectric layers is conveniently on the same order as that of the thin film layers, although as will later be described, the thickness of the dielectric layers can be varied depending upon the amount of thin metallic film material that is included within the overall media 14, that is, the relative volume percentage of thin metallic film elements 21 to the total volume of the media 14. The grid-like arrangement of the voids 34, 36 results from particular methods employed in depositing the thin film and dielectric layers 21, 22. However, the thin film layer 20 could be formed by suspending thin metallic film elements 21 in a dielectric insulator media with the dielectric separating adjacent elements 21.

A single layer of thin metallic film elements 21 arranged in a well ordered grid-like array is also contemplated by the present invention. By stacking the individual arrayed layers 20 with alternate dielectric layers 22, the total film volume can be selected to obtain properties desired for a given application. When individual thin film elements 21 are arrayed in either a single layer 20 or when such layers are in turn arrayed in the stacked media 14 described hereinabove, the single layer and the laminated media can have magnetic properties generally corresponding to those of a continuous thin film. However, the conductivity either in a single layer 20 or in the laminated media 14 is virtually eliminated by the separate island configuration of the individual elements 21 compared to a continuous thin film. Since the dimensions of the individual thin metallic film elements are less than the wavelength of the frequency of interest, the media can be penetrated by electromagnetic energy.

Figure 6:
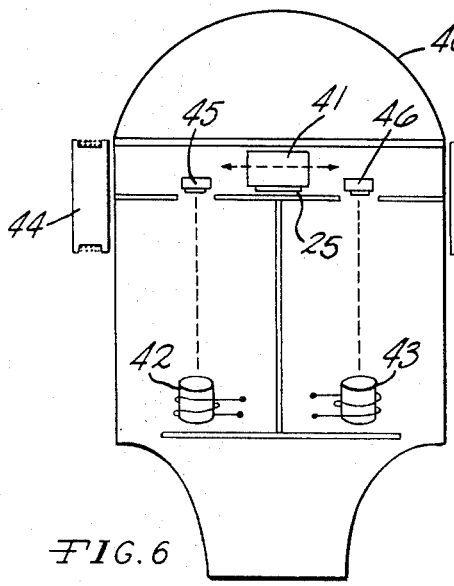
FIG. 6 is a schematic view of an experimental apparatus used in the process of making the thin film media.

The arrangement of the magnetodielectric media 14 described hereinabove will be more apparent from an understanding of the deposition process by means of the apparatus shown in FIG. 6. The deposition process, per se, does not form an essential part of the present invention and hence will be described only to the extent necessary to understand the present invention. A bell jar 40 is evacuated to pressures in the low $10^{-6}$ torr range during the deposition process. The substrate 25 (FIGS. 3 and 6) is mounted on a suitable carriage block 41 which in turn is mounted in the bell jar 40 for transverse reciprocating motion under external control. The substrate 25 is a soft glass slide approximately one millimeter thick that has been cleaned prior to deposition to yield films that are uniform and relatively free of pin holes. The grid-like array of each layer 20, 22 is obtained by covering the substrate 25 with an appropriate deposition mask. The desired array geometry could also be obtained by post-deposition photo resist acid etching.

The carriage 41 is moved alternately above and between two heated sources 42, 43 to deposit the layers 20, 22 on the prepared substrate 25. Source 42 contains a Ni-Fe alloy and source 43 contains SiO. Carriage block 41 is moved during deposition by means of a mechanical vacuum feedthrough and other suitable fixtures (not shown). The substrate 25 is maintained at the desired temperature by resistance heating units attached thereto and to the carriage block 41. The substrate temperature was maintained at about a nominal temperature of 250° C. for the examples to be set forth hereinafter. A pair of Helmholtz coils 44 are externally mounted to provide a uniform bias field in the plane of the film during deposition. The direction of this field determines the direction of the induced anisotropy axis (axis M, FIG. 2). The thickness of the layers is monitored during deposition with a pair of water-cooled quartz crystal monitors 45, 46 which are also exposed to the vapors. An evaporation rate of about 15–20 A. per second was used for depositing both the Ni-Fe alloy and the SiO for the examples to be set forth hereinafter.

For purposes of simplification, certain parameters of a thin film media 14 may be evaluated in terms of a single continuous thin film. The results based on single continuous films can then be applied to the thin film media 14 having the discrete elements 21. Data for compositional variations in continuous thin films is particularly useful in predicting the effect of compositional variations in media 14.

Figure 7:
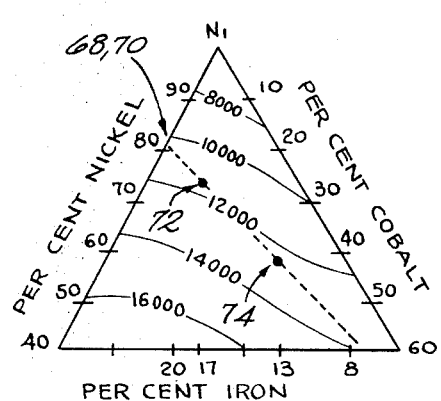
FIG. 7 is a Ni-Fe-Co ternary diagram for continuous thin ferromagnetic films showing the zero magnetostriction line.

FIG. 7 is a ternary diagram for nickel-iron-cobalt compositions including the examples set forth below for continuous films. Superimposed on FIG. 7 are magnetization contours (solid lines) and the contour of bulk compositions with zero magnetostriction (dashed line). Compositions for the examples were intentionally selected from along the zero magnetostriction contour to minimize stress contributions to the easy axis dispersion. The compositions for Examples I–IV are designated in FIG. 7 at 68, 70, 72, 74, respectively. The susceptibility of the continuous thin films is of limited interest for comparison with the susceptibility to be evaluated for the thin film magnetodielectric media 14. Hence for completeness, experimental susceptibilities are included in the examples. The dispersion parameter $\alpha_q$, a measure of the dispersion in the direction of the easy axis, is the angle in degrees, measured from the easy axis, of a quartile of the distribution of axes. $X'$ is the real part of the measured magnetic susceptibility and $X''$ is the imaginary part of the measured susceptibility relative to the susceptibility of free space. The other parameters are the saturation magnetization $M_s$ (gauss); the damping constant $\alpha$; thickness $t$ (angstroms); and the anisotropy field $H_k$ (oersteds).

TABLE 1

| Ex. | Nominal composition | $M_s$ | $\alpha$ | $t$ | $H_k$ | $\alpha_q$ |
|---|---|---|---|---|---|---|
| 1 | .80Ni/.20Fe | 10,600 | .012 | 1,000 | 3.50 | (¹) |
| 2 | .80Ni/.20Fe | 10,600 | .018 | 2,000 | 4.22 | 1.7 |
| 3 | .73Ni/.17Fe/.10Co | 11,300 | .008 | 1,000 | 14.4 | 0.45 |
| 4 | .57Ni/.13Fe/.30Co | 11,850 | .010 | 1,000 | 28.75 | 0.65 |

¹ Negligible and not measured.

TABLE 2

| Freq., mHz. | Example 2 | | Example 3 | | Example 4 | |
|---|---|---|---|---|---|---|
| | $X'$ | $X''$ | $X'$ | $X''$ | $X'$ | $X''$ |
| 400 | 1,795.6 | 1,154.9 | 992.5 | 50.0 | 441.8 | 25.5 |
| 600 | 917.0 | 2,111.3 | 1,090.6 | 237.0 | 480.4 | 79.8 |
| 700 | −31.0 | 2,395.0 | | | | |
| 800 | −507.6 | 2,113.1 | 1,299.5 | 425.5 | 583.5 | 55.3 |
| 1,000 | −663.2 | 955.5 | 1,685.9 | 1,153.9 | 686.8 | 152.5 |
| 1,130 | | | −270.0 | 3,350.0 | | |
| 1,200 | −537.9 | 474.3 | −555.5 | 3,144.8 | 843.1 | 194.1 |
| 1,400 | −428.9 | 247.5 | −1,019.3 | 994.5 | 1,080.0 | 770.0 |
| 1,500 | | | | | 1,190.0 | 1,300.0 |
| 1,600 | | | −820.0 | 405.7 | 1,170.4 | 1,166.3 |
| 1,650 | | | | | 775.0 | 2,005.2 |
| 1,700 | | | | | 512.7 | 1,820.8 |
| 1,800 | | | | | −435.4 | 1,660.2 |
| 2,000 | | | | | −770.0 | 894.0 |

Figure 8:
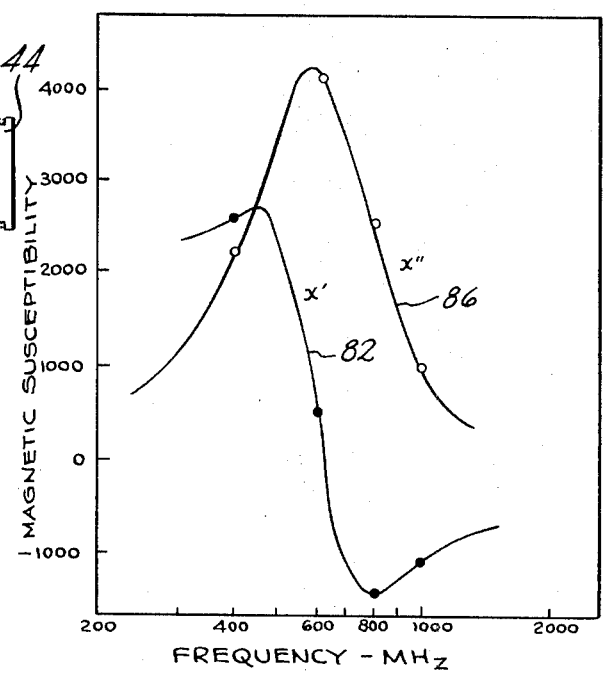
FIG. 8 illustrates initial susceptibility versus frequency curves for a continuous thin film.

The susceptibility as a function of frequency for Example 1 is shown in FIG. 8 wherein the real part of the magnetic susceptibility, $X'$, (measured) is designated 82, and the imaginary part of the susceptibility, $X''$, (measured) is designated 86. The examples set forth hereinabove clearly indicate the change in the shape in the susceptibility spectrum with variations in composition. This information is valuable in selecting a composition to obtain susceptibilities desired for the thin film media 14, depending on the particular application.

The collective electromagnetic behavior of a thin film magnetodielectric, the layered media 14 (FIGS. 1–5), can be evaluated through methods of molecular optics based on similar techniques used successfully in the theoretical development of artificial dielectrics for centimeter waves. The primary difference is that with an artificial dielectric at centimeter wavelengths, one is concerned with a dilute array of perfectly conducting scatterers while in the thin film magnetodielectric media 14 there is a closely packed array of permeable anisotropic scatterers. The thin film magnetodielectric media 14 can first be considered as having ellipsoidal film elements in an orthorhombic lattice and the solution for this general case can then be specialized to degenerate lattice symmetries and shapes.

The thin film magnetodielectric may be considered homogeneous in an electromagnetic sense since the individual film elements 21 and the lattice spacings or voids 34, 36 are small fractions of a wavelength of the incident radiation 12. The effective electric and magnetic susceptibility tensors, $$\{\overline{\overline{X}}_e\} \{\overline{\overline{X}}_m\}$$

are averaged over a volume V, the dimensions of which are comparable with the wavelength and these tensors are regarded as the constitutive parameters. The magnetic susceptibilities are complex. Although certain assumptions are required to develop the relationship for the constitutive parameters, some of the problems normally encountered and requiring higher order approximations are a result of nonstatic terms associated with eddy current shielding and loss. These terms and the effect of eddy current shielding and loss are eliminated or sharply reduced by restricting the film thickness ($a_x$, FIG. 5) to less than a skin depth. The small dimension semi-axis of the ellipsoid equivalent corresponding to the thickness dimension for a film element 21 is made much smaller than the semi-axes corresponding to the dimensions $a_z$, $a_y$ in the plane of the film element. A thickness semi-axis small compared to the skin depth is compatible with a single domain configuration.

Knowing that the field interior to an ellipsoid is uniform and assuming, temporarily, that the ellipsoid is penetrated by both the electric and the magnetic field, it can be shown that the average effective susceptibility tensors are defined by the following relationships:

$$\{\overline{\overline{X}}^m\} = V_f \overline{\overline{X}}^m \cdot (\overline{\overline{I}} + \overline{\overline{D}} \cdot \overline{\overline{X}}^m)^{-1}$$

$$\{\overline{\overline{X}}^e\} = V_f \overline{\overline{X}}^e \cdot (\overline{\overline{I}} + \overline{\overline{D}} \cdot \overline{\overline{X}}^e)^{-1}$$

where $V_f$ is the film volume fraction, $V_f = Nv$, $v$ is the volume of each ellipsoidal film element, $N$ is the number of identical elements per unit volume, $\overline{\overline{D}}$ is the demagnetizing (depolarizing) tensor and $I$ is the idemfactor (unity dyad). For the situation where $$|\overline{\overline{D}} \cdot \overline{\overline{X}}^e| \gg 1 \text{ and } |\overline{\overline{D}} \cdot X^m| \ll 1$$

the average effective susceptibility tensors become $$\{\overline{\overline{X}}^m\} \simeq V_f \overline{\overline{X}}^m$$

$$\{\overline{\overline{X}}^e\} \simeq N \overline{\overline{\alpha}}_e$$

where the tensor $\overline{\overline{\alpha}}_e$ is the electric polarizability of one thin film element 21. These relationships show that the effective magnetic susceptibility for the media 14 is the intrinsic susceptibility of the film material diluted only by the volume fraction of dielectric material and that the effective electric susceptibility of the media is independent of the film conductivity. Hence the conditions $$|\overline{\overline{D}} \cdot \overline{\overline{X}}^e| \gg 1 \text{ and } |\overline{\overline{D}} \cdot \overline{\overline{X}}^m| \ll 1$$

are necessary requirements for an effective thin film magnetodielectric media.

Figure 9A:
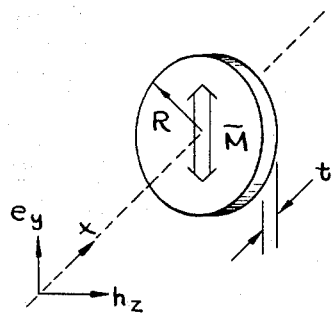
FIGS. 9a and 9b illustrate reference orientations for transverse and parallel propagation in a thin film array.
Figure 9B:
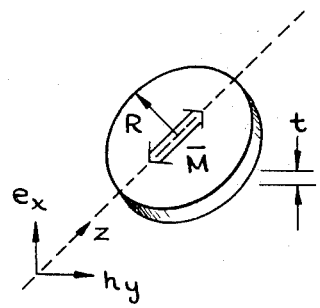

For the principal modes of propagation, that is, the transverse or normal propagation mode shown schematically in FIG. 9a and the parallel propagation mode shown schematically in FIG. 9b, within certain limitations for the transverse mode of propagation the effective magnetic susceptibility tensor is defined by the following relationship:

$$\{\overline{\overline{X}}^m\} = \frac{V_f X_{zz}}{1 + D_z V_f X_{zz}} \hat{z} \hat{z}$$

and for the parallel mode of propagation the effective average magnetic susceptibility tensor is:

$$\{\overline{\overline{X}}^m\} = \frac{V_f X_{yy}}{1 + D_y V_f X_{yy}} \hat{y} \hat{y}$$

where $X_{zz}$, $X_{yy}$ are the dominant components of the magnetic susceptibility tensor for a continuous film. The quantities $X_{zz}$ and $X_{yy}$ are identical numbers corresponding to the susceptibilities for a continuous thin film, for example, as set forth hereinabove in connection with the Examples 1–4. $D_z$ and $D_y$ are shape demagnetizing factors for one stack of thin film elements 21 in the Z and Y directions, respectively, and $\hat{z}\hat{z}$ and $\hat{y}\hat{y}$ denote that $$\{\overline{\overline{X}}^m\}$$

is directed parallel to the Z axis and the Y axis, respectively.

A large difference exists in macroscopically induced electric and magnetic dipole moments due to a large difference in the electric and magnetic susceptibility of the film element 21. The large induced electric dipole expels the incident electric field from the film interior while the smaller magnetic dipole moment has little effect on the incident magnetic field. Thus $$\{\overline{\overline{X}}^e\}$$

is only a function of the geometry and $$\{\overline{\overline{X}}^m\}$$

is a function only of the intrinsic magnetic susceptibility. Because a small magnetic dipole moment is induced in the film element, the average effective magnetic susceptibility tensor for a very dense array will be nearly independent of the effect of the lattice interaction.

The feasibility of the thin film magnetodielectric media 14 and the validity of several conclusions set forth hereinabove has been verified experimentally. However, it should be appreciated that to optimize the parameters of the thin film magnetodielectrics would require a complete investigation of the dimensional, compositional and geometrical parameters of a thin film magnetodielectric. Based on an examination of the ellipsoidal film scatterers in an orthorhombic lattice, it can be shown that there are eight parameters of particular interest; the film elements dimensions ($a_x$, $a_y$, $a_z$), the lattice dimensions ($b_x$, $b_y$, $b_z$), the film composition and the dielectric composition. The effect of variations in the composition of the film and of the dielectric, although important, will not be considered further since they have been briefly referred to hereinabove, and they are more predictable than the other variations. Hence for the experimental results set forth hereinafter, all of the samples considered had film elements 21 which had a nominal composition of 0.80 Ni/0.20 Fe and the insulating elements 24 were SiO.

For certain of the relationships set forth hereinabove, it was assumed that the thickness $t_f$ of an individual film element 21 is less than the skin depth and also that the dimensions $a_y$ and $a_z$ (more correctly, the semi-axes of an equivalent ellipsoid) are much less than a wavelength. The first assumption requires a film thickness on the order of about 1000 A. For microwave frequencies this condition is satisfied using permalloy films whose thickness is in the range of from 100 to 2000 A. Problems can be expected for thicknesses less than 100 A and hence this is a practical and critical lower limit. The second condition is easily satisfied in the 10 mHz. to 100 gHz. range. Moreover, it can be shown that electromagnetic energy cannot propagate into a continuous film laminate whose dimensions are comparable to a wavelength or greater. The situation for a dilute film loading ($V_f$ much less than 1) is considered of little interest and hence the dielectric thickness $t_d$ should be comparable to or less than the thickness of the film $t_f$.

Figure 16:
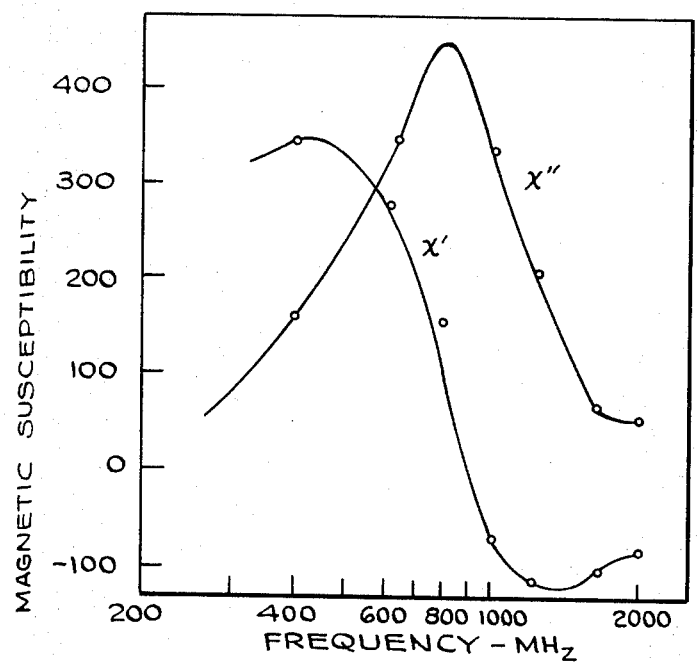
FIG. 16 is a susceptibility versus frequency curve corresponding to those of FIGS. 10 and 11 but for a slightly different thin film element geometry.

The range of parameters was selected for an internally consistent investigation of the film volume fraction, $V_f$, the film thickness, $t_f$, and the effective anisotropy field $H_k'$, as will later be defined more fully in connection with the hysteresis loops (FIG. 16). Test results were obtained for nine thin film magnetodielectric samples having the geometry of FIGS. 2–5 with lattice dimensions $b_y = .025$ inch and $b_z = 0.100$ inch. The length of each side 28 ($a_z$) of each element 21 was 0.095 inch, the dielectric grid space 34, 36 was 0.005 inch and the easy axis dimension $a_y$ (side 26) was 0.020 inch. The samples were formed so that the easy axis M was always parallel to the short side 26. This array geometry was obtained using a 10×40 mesh Be-Cu foil deposition mask with 0.002 inch by 0.005 inch rectangular wires. A minimum dimension of 0.020 inch in the plane of the film or a minimum dimension-tothickness ratio of 5000 to 1 can be easily achieved in an orderly array using practical deposition techniques. Even smaller minimum dimensions could be obtained in an orderly array, as contrasted to random particle orientation, with greater care and more precise deposition masks. A tenth sample, Example 14, discussed hereinafter is also set forth. The ten samples tested had a range of metal and dielectric thicknesses, $t_f$ and $t_d$, from 500 A. to 4000 A.

The results of this investigation are set forth in the following Examples 5–14 wherein the quantities referred to are: $V_f$=film volume fraction; $t_f$=thickness of an individual film element 21 (microns); $t_d$=thickness of an individual SiO element 24 (microns); $N_f$=total number of film layers 20; $N_d$=total number of SiO layers 22; $l=(N_f t_f N_d t_d)$=total thickness of the media 14 in microns; $X^e$=the electric susceptibility and $\alpha_q$=the dispersion parameter (degrees). The effective anisotropy field, $H_k'$ (oersteds) and the easy axis demagnetizing field, $H_d^e$ (oersteds), are defined hereinafter.

TABLE 3

| Ex. | $V_f$ | $N^j$ | $N_d$ | $H_k'$ | $X^e$ | $l$ | $t_f$ | $t_d$ | $H_d^e$ | $\alpha_a$ |
|---|---|---|---|---|---|---|---|---|---|---|
| 5 | .152 | 20 | 19 | 7.53 | 253–j3 | 9.6 | .1 | .4 | 26.5 | 5.6 |
| 6 | .253 | 30 | 29 | 9.44 | 303–j7 | 8.8 | .1 | .2 | 42.0 | 5.55 |
| 7 | .380 | 31 | 30 | 4.50 | 835–j54 | 3.05 | .05 | .05 | 22.2 | 6.45 |
| 8 | .380 | 30 | 29 | 8.90 | 425–j13 | 5.9 | .1 | .1 | 40.2 | 5.9 |
| 9 | .380 | 18 | 17 | 9.65 | 657–j70 | 7.0 | .2 | .2 | 50.5 | 5.3 |
| 10 | .380 | 15 | 14 | 12.94 | 554–j134 | 8.7 | .3 | .3 | 60.0 | 5.8 |
| 11 | .506 | 26 | 25 | 13.57 | 317–j15 | 7.7 | .2 | .1 | 74.1 | 5.25 |
| 12 | .506 | 13 | 12 | 7.95 | 575–j18 | 3.8 | .2 | .1 | 38.2 | 5.7 |
| 13 | .608 | 18 | 17 | 24.2 | 338–j12 | 8.9 | .4 | .1 | 111.2 | 6.0 |
| 14 | .533 | 35 | 34 | 8.80 | 231–j23 | 10.4 | .2 | .1 | 128 | 2.1 |

TABLE 4

| Freq., mHz. | Example 5 | | Example 6 | | Example 7 | | Example 8 | |
|---|---|---|---|---|---|---|---|---|
| | X' | X'' | X' | X'' | X' | X'' | X' | X'' |
| 400 | 139.6 | 49.7 | 177.1 | 48.6 | 253.3 | 270.7 | 249.3 | 101.6 |
| 600 | 133.8 | 91.9 | 166.1 | 104.2 | 122.0 | 313.2 | 226.6 | 200.1 |
| 800 | 89.9 | 170.2 | 122.5 | 199.4 | −11.8 | 267.6 | 113.0 | 340.0 |
| 1,000 | 0.4 | 170.3 | 4.1 | 232.6 | −59.0 | 174.6 | −17.9 | 303.2 |
| 1,200 | −43.0 | 117.2 | −62.1 | 159.3 | −73.0 | 132.4 | −78.8 | 175.9 |
| 1,400 | −47.1 | 74.7 | −58.1 | 72.7 | −61.1 | 81.1 | −82.3 | 118.4 |
| 1,600 | −50.2 | 54.5 | −83.5 | 45.1 | −62.1 | 63.1 | −79.6 | 76.2 |
| 1,800 | −42.1 | 38.7 | −48.1 | 52.3 | −55.0 | 45.7 | −64.3 | 65.9 |
| 2,000 | −37.9 | 24.4 | −44.0 | 36.4 | −48.1 | 35.9 | −52.0 | 40.8 |

TABLE 5

| Freq., mHz. | Example 9 | | Example 10 | | Example 11 | |
|---|---|---|---|---|---|---|
| | X' | X'' | X' | X'' | X' | X'' |
| 400 | 235.4 | 101.9 | 152.3 | 75.6 | 198.0 | 77.4 |
| 600 | 201.9 | 172.1 | 126.9 | 102.6 | 187.1 | 131.2 |
| 800 | 113.9 | 278.0 | 88.9 | 140.6 | 140.9 | 196.2 |
| 1,000 | 36.7 | 213.8 | 59.7 | 130.7 | 62.1 | 228.6 |
| 1,200 | −28.5 | 178.5 | 24.0 | 135.0 | −27.4 | 218.2 |
| 1,400 | −49.6 | 127.6 | −9.8 | 108.9 | −42.3 | 123.1 |
| 1,600 | −62.5 | 107.7 | −33.2 | 91.7 | −117.8 | 41.4 |
| 1,800 | −50.5 | 39.7 | −32.9 | 65.0 | −58.4 | 89.1 |
| 2,000 | −35.5 | 47.7 | −32.7 | 46.5 | −55.8 | 67.4 |

TABLE 6

| Freq., mHz. | Example 12 | | Example 13 | | Example 14 | |
|---|---|---|---|---|---|---|
| | X' | X'' | X' | X'' | X' | X'' |
| 400 | 347.0 | 169.8 | 133.3 | 83.5 | 412.9 | 603.1 |
| 600 | 266.6 | 296.4 | 107.5 | 102.9 | −59.7 | 555.2 |
| 800 | 90.8 | 406.2 | 71.6 | 133.2 | −197.3 | 408.5 |
| 1,000 | −44.0 | 300.5 | 34.2 | 118.1 | −172.5 | 224.9 |
| 1,200 | −86.4 | 220.6 | 2.1 | 106.2 | −137.6 | 140.8 |
| 1,400 | −82.6 | 123.9 | −8.6 | 84.0 | −101.6 | 78.3 |
| 1,600 | −114.9 | 66.7 | −25.0 | 72.5 | −101.6 | 73.3 |
| 1,800 | −76.5 | 85.4 | −25.7 | 59.3 | −74.3 | 58.7 |
| 2,000 | −28.0 | 30.7 | −27.7 | 50.6 | | |

Figure 10:
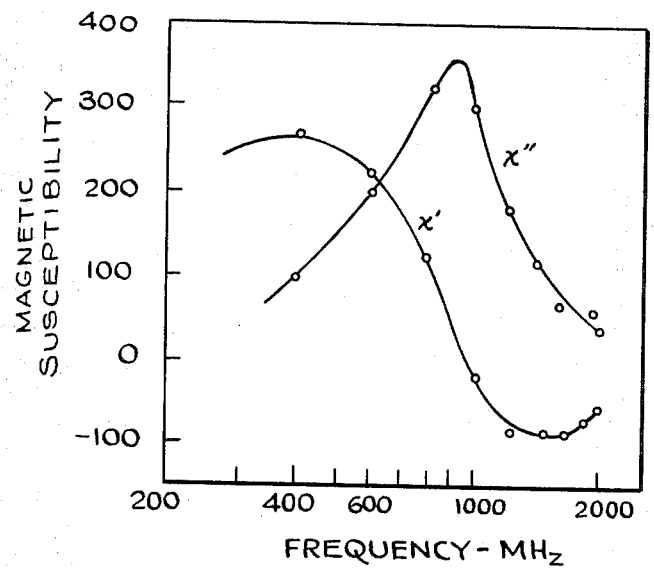
FIGS. 10 and 11 are susceptibility versus frequency curves for thin film element arrays of the present invention.
Figure 11:
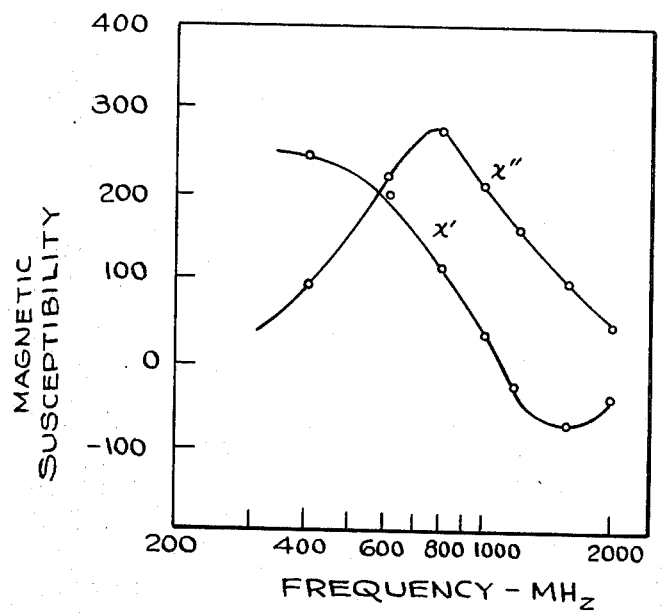

For purposes of further illustration, the magnetic susceptibilities of the media of Examples 8 and 9 are plotted in FIGS. 10 and 11, respectively.

Figure 12:
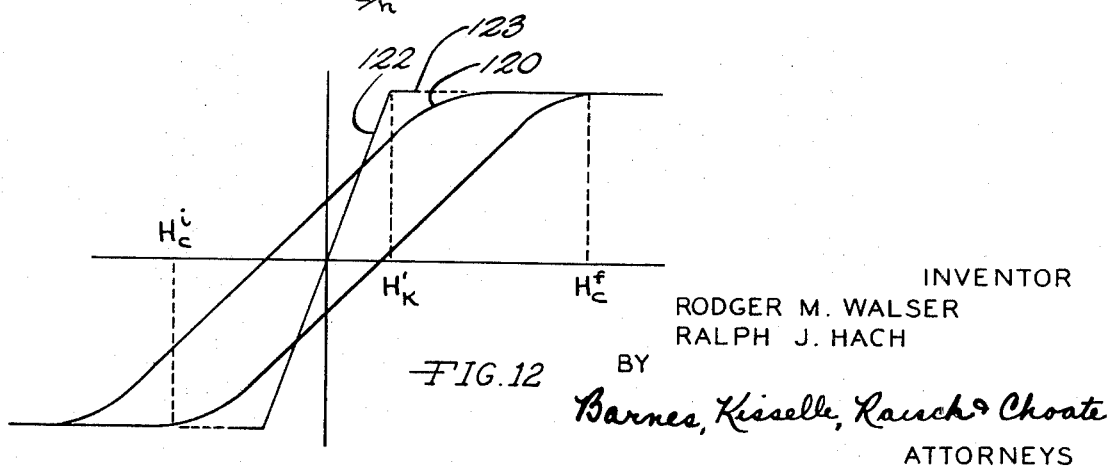
FIG. 12 is a hysteresis loop showing parameters useful to an understanding of the present invention.

The theoretical results referred to hereinabove for determining the susceptibility of the media 14 in terms of the intrinsic susceptibility of a continuous thin film, the geometry of the array and volume fraction can be verified by evaluating the hysteresis loops for the above examples. Verification of the susceptibility in terms of the hystereis loops provides a practical mechanism for corroborating the shape of the susceptibility curves. This corroboration is obtained by ascertaining the initial magnetic susceptibility $X_0$ and the natural resonant frequency of the magnetic susceptibility from which the general shape of the magnetic susceptibility spectra can be predicted. Referring to FIG. 12 which illustrates typical easy and hard axis hysteresis loops 120 and 122, respectively, at the points $H_c^i$ and $H_c^f$ where the easy axis loop 120 begins to deviate from the saturation line, the applied field must be just equal to the difference between the coercive force $H_c$, and the easy axis demagnetizing field $D^e M_s$. Therefore, $H_c^i = H_c - D^e M_s$ and $H_c^f = H_c + D^e M_s$, and hence:

$$D^e M_s = \frac{1}{2}(H_c^f - H_c^i)$$

where $D^e$ is the easy axis shape demagnetizing factor.

Assuming that the magnetization reverses by rotation under a hard axis driving field, it can then be shown that the effective anisotropy field $H_k'$ is given by the expression:

$$H_k' = H_k + (D^h - D^e) M_s$$

where $H_k$ is the intrinsic anisotropy field, $M_s$ is the intrinsic saturation magnetization, and $D^h$ is the effective hard axis demagnetizing factor. If the magnetostatic energy becomes sufficiently large, edge domains will form to neutralize the easy axis field and hence the net easy axis field must be reduced to a value equal to or less than $H_c$. Therefore, it is approximately true that:

$$H_k' \simeq H_k + D^h M_s = H_k + H_d^h$$

where $H_d^h$ is the hard axis demagnetizing field. The field $H_k'$ is determined from the saturation point of the hard axis loop as indicated by the point labelled $H_k'$ in FIG. 12. As a practical matter, the point $H_k'$ must be determined experimentally by extrapolating a hard axis loop obtained at low applied field to intercept with the saturation line 123.

The slope of the hard axis hysteresis loop 122 yields the effective low frequency susceptibility limit. For the TFM this limit is calculated from the relationship:

$$\{X_0\} = \frac{V_f X_0}{1 + V_f D_V^h X_0}$$

where $X_0$ is the intrinsic low frequency susceptibility limit and $D_V^h$ is the hard axis demagnetizing factor for the volume V of one stack of alternate thin film and dielectric elements in the array. However, from a hysteresis loop for a continuous thin film by definition $X_0 = M_s/H_k$ so that:

$$\{X_0\} = \frac{V_f M_s}{H_k + V_f D_V^h M_s} = M_s'/H_k'$$

where the effective magnetization $M_s'$ and anisotropy $H_k'$ are defined by $$M_s' = V_f M_s$$

$$H_k' = H_k + V_f D_V^h M_s$$

Hence by measuring the intrinsic parameters $H_k$ and $M_s$ from the magnetization curve for a continuous film, one can obtain the initial magnetic susceptibility $\{X_0\}$ for an array of film elements.

The above relationships can be used to verify the shape of the magnetic susceptibility spectra and also to design for a desired shape of the magnetic susceptibility spectra since dimensionally it must be that the hard axis demagnetizing field $H_d^h$ is:

$$H_d^h = V_f D_V^h M_s$$

Similarly, the easy axis demagnetizing field is:

$$H_d^e = V_f D_V^e M_s$$

where $D_V^e$ and $D_V^h$ are again the easy and hard axis demagnetizing factors of the volume V for one stack of alternate thin film and dielectric elements in the array.

Figure 13:
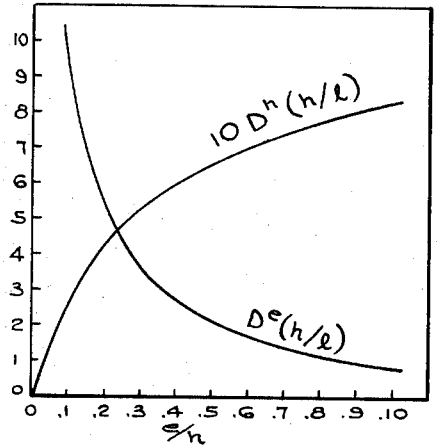
FIG. 13 illustrates shape demagnetizing factor curves for thin film ellipsoids.

For specific applications, the shape demagnetizing factors of the rectangular film elements 21 can be closely approximated by those of an equivalent ellipsoid. The shape demagnetizing factor for very flat ellipsoids are plotted in FIG. 13 as a function of the ratios $e/h$ and $h/l$, where $e$ and $h$ are the easy and hard axis dimensions 26 ($a_y$), 28 ($a_z$) and $l$ is the total thickness of the media.

For the gometry of the elements in the media 14 of FIGS. 2–5 and the dimensions used in Examples 5–14 hereinabove, $e/h=.210$ and $h=.095''$; so that:

$$H_d^e = 19.6 V_f M_s l$$

and $$H_d^h = 1.75 V_f M_s l$$

Also for the specific examples $$V_f = .76 \frac{N_f t_f}{l}$$

and consequently:

$$H_d^e = 14.9 N_f t_f$$

and $$H_d^h = 1.33 N_f t_f$$

where $t_f$ is in microns and where $M_s$ has an assumed value of $10^4$ gauss.

Figure 14:
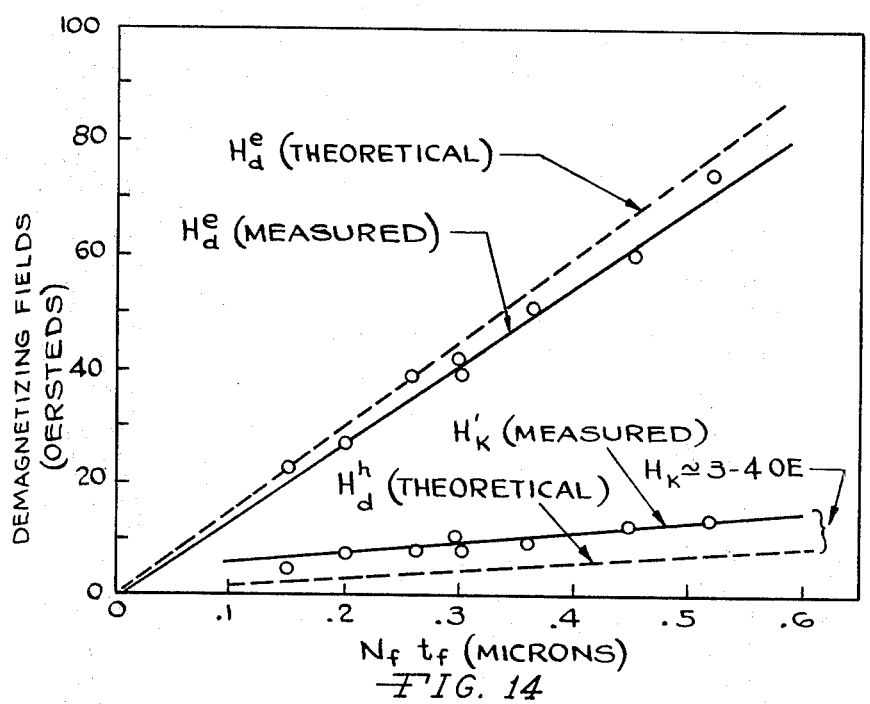
FIG. 14 shows plots of experimental and theoretical demagnetizing fields as a function of total film thickness in a stack.

Shape demagnetizing fields for eight samples having the 10 x 40 mesh geometry are compared in FIG. 14 with experimental values that were obtained from the measured hysteresis loops for the samples. The measured easy axis demagnetizing fields of the rectangular film elements show a deviation from those of an equivalent ellipsoid that could be expected for large film thicknesses. The differences of the measured values of $H_k'$ and the theoretical hard axis demagnetizing fields $H_d^h$ are 4–6 oersteds, which are within a range of intrinsic anisotropy fields $H_k$ that might be expected for Permalloy films. The correlation of the measured and theoretical shape demagnetizing fields is very satisfactory and extremely more usable in practical applications than, for example, comparison between measured and theoretical susceptibility spectra.

Figure 15:
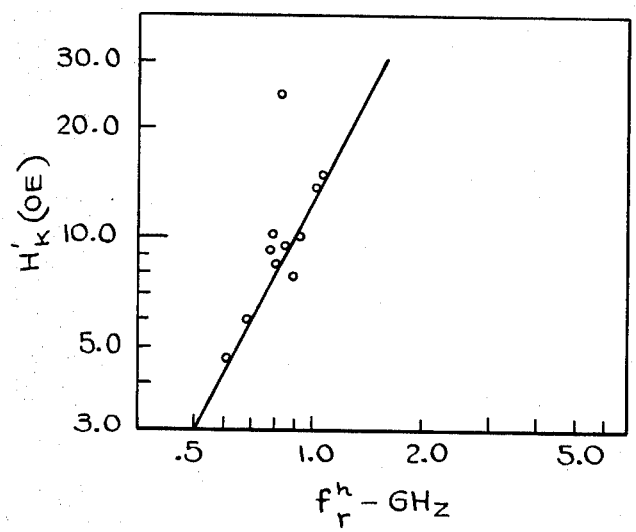
FIG. 15 is a plot of effective anisotropy fields in thin film arrays as a function of the natural resonant frequency.

The theoretical susceptibility spectra of a thin film magnetodielectric can also be characterized by its effective low frequency limit $\{X_o\}$ and its natural resonant frequency $f_r^n$. The natural resonant frequency $f_r^n$ of a thin film magnetodielectric is obtained from the following relationship:

$$f_r^n = 2.8 (M_s H_k')^{1/2}$$

where $f_r^n$ is in megaHertz for the saturation magnetization $M_s$ in gauss and the effective anisotropy field $H_k'$ in oersteds. This equation is plotted in FIG. 15 along with the experimental values of $f_r^n$ obtained from the susceptibility spectra for the above examples versus the experimental values of $H_k'$ obtained from the BH loop for the examples.

Referring again to FIG. 14, the effective anisotropy field $H_k$ is, for large thin film magnetodielectric thicknesses, essentially a function of the hard axis demagnetizing field $D_y^h V_f M_s$. If the thickness is to be increased substantially and if a reasonably low resonant frequency is desired, then the hard axis demagnetizing field must be reduced. The hard axis field may be decreased by increasing the hard axis dimension $h$ (28, $a_z$, FIG. 2). A sample having a rectangular geometry was made using a 0 x 40 mesh evaporation mask to confirm this point. This sample had the following dimensions: $e=0.020$ inch and $h=0.500$ inch to yield an $e/h$ ratio of 0.040. The other parameters and experimental data obtained from this example are set forth hereinabove as Example 14 in Tables 3 and 6, and the susceptibility spectra is shown in FIG. 16. Comparing these results for Example 14 with the data for Example 11, for a similarly constructed sample with $e/h=.210$ and $h=.095''$, the sample of Example 14 with $h=.500''$ is 2.7 microns thicker than the sample of Example 11 with $h=.095''$, yet its anisotropy is only 8.8 oersteds compared with 13.57 oersteds for the thinner sample.

In summary, the thin film magnetodielectric media 14 described hereinabove can be characterized as a semi-artificial media for although the electric polarizability is due to macroscopic electric dipoles that are induced in the films, the magnetic polarizability is primarily of atomic origin. By separating known thin films into individual elements, such as flakes or discs, and orderly arranging the elements in an array, the magnetic properties of the thin film are retained whereas the conductivity is nearly eliminated. One most important feature of the present invention is that the effective magnetic susceptibility of the thin film magnetodielectric media 14 is obtained by a linear supposition of the volume susceptibility of the individual film elements 21. The media has a real dielectric constant, determined primarily by the shape polarizability of the film. Its dielectric loss tangent can be made extremely small, that is, the imaginary part of the electric susceptibility, $X^e$, is much less than the real part for certain propagation modes and it is completely penetrable by radio and microwave energy. The initial magnetic susceptibility obtained far exceeds all other penetrable materials by more than at least an order of magnitude over the high frequency range of interest. The relative susceptibilities of the thin film magnetodielectric media disclosed herein are one to two orders of magnitude larger than those that have been obtained with prior art penetrable magnetic medium in this frequency range.

The thin film magnetodielectrics and the magnetic susceptibilities have been disclosed and described hereinabove based on an unbiased mode of operation. However, by analogy to biased modes of operation used heretofore in ferrite applications, biased operation of the thin film magnetodielectrics is also contemplated by the present invention. One important advantage in using biased magnetodielectrics for certain applications would be that since the natural resonant frequency of a thin film magnetodielectric is substantially higher than the natural resonant frequency of ferrites, less internal bias fields would be required to obtain a desired induced resonant frequency in the thin film magnetodielectric material. Additionally, the thin film magnetodielectric retains other desirable properties of a thin film as compared to a ferrite, for example, a narrow resonance linewidth and a higher figure of merit. Moreover, the square loop hysteresis properties obtainable with thin film magnetodielectrics of the present invention together with high permeabilities also suggests use of the thin film magnetodielectrics of the present invention in lower frequency.

It will be understood that the thin film magnetodielectric media has been described hereinabove for purposes of explanation and illustration and is not intended to indicate limits of the present invention, the scope of which is defined by the following claims.

We claim:

1. In combination a source of electromagnetic radiation having a predetermined frequency within a frequency range of from approximately radio frequency to approximately millimeter wavelengths and a magnetodielectric media to receive incident radiation from said source for propagation of said radiation into said media comprising a first plurality of thin film element layers and a second plurality of dielectric media layers stacked alternately with said thin film layers in a first direction and with each layer having its respective plane parallel to the plane of an adjacent layer, each thin film layer comprising a plurality of individual thin film elements having major dimensions and a thickness dimension and being orderly arranged in their respective layers with said thickness dimension along said first direction and said major dimensions disposed in the plane of their respective layers, each element having a well defined magnetic anisotropy axis parallel to one of its major dimensions, and wherein said elements in each layer further are arranged so that substantially all of said elements have commonly directed magnetic anisotropy axes.

2. The magnetodielectric media set forth in claim 1 wherein said thin film elements are metallic material selected from the group consisting of iron, nickel, and alloys thereof.

3. The magnetodielectric media set forth in claim 2 wherein said metallic material is approximately 80 percent nickel by weight and 20 percent iron.

4. The magnetodielectric media set forth in claim 1 wherein said thin film elements are metallic material selected from the group consisting of iron, nickel, cobalt and alloys thereof.

5. The combination set forth in claim 1 wherein each of said elements have a thickness dimension much smaller than the skin depth at said predetermined frequency and wherein said major dimensions are much smaller than the corresponding wavelength at said predetermined frequency.

6. The magnetodielectric media set forth in claim 5 wherein each film element has a thickness dimension on the order of one thousand angstroms.

7. The magnetodielectric media set forth in claim 1 wherein said media has an effective magnetic susceptibility that is a function substantially only of an intrinsic magnetic susceptibility of a continuous thin film of said metallic material and of a volume fraction whose value is determined by the total volume of said thin film elements in said array compared to the total volume of said media.

8. The magnetodielectric media set forth in claim 7 wherein said magnetodielectric media is characterized by a demagnetizing tensor $\bar{\bar{D}}$, an electric susceptibility tensor $\bar{\bar{X}}^e$ and a magnetic susceptibility tensor $\bar{\bar{X}}^m$ approximately satisfying the relationships:

$$|\bar{\bar{D}} \cdot \bar{\bar{X}}^e| \gg 1 \text{ and } |\bar{\bar{D}} \cdot \bar{\bar{X}}^m| \ll 1$$

9. The method of making a magnetic media adapted for interaction with energy fields inside said media comprising forming on a base a plurality of layers of thin metallic film alternately arranged with a plurality of thin layers of dielectric material and separating each thin film layer into a plurality of discrete thin metallic film elements.

10. The method set forth in claim 9 wherein thin metallic films are formed by depositing metallic material while subjecting said metallic material to a uniformly directed magnetic field to induce a well defined magnetic anisotropy axis in each film whereby substantially all of the thin film elements have their magnetic anisotropy axis oriented in substantially the same direction.

11. The method set forth in claim 9 wherein said layers of thin metallic film are formed by depositing metallic material through a mask to thereby form in each thin film layer a plurality of discrete thin film elements.

12. The method set forth in claim 9 wherein said thin metallic films are formed by depositing metallic material and said thin film layers are separated into discrete thin film elements by post-deposition etching.

13. The method set forth in claim 9 wherein said thin metallic film layers are separated into discrete thin metallic film elements during formation of said thin metallic film layers by depositing metallic material under controlled conditions so that each film element has a preselected geometry, a preselected position and orientation in said media and a preselected separation from adjacent elements in said media to provide an ordered array.

14. The method set forth in claim 13 wherein said metallic material is deposited through a mask in an environment subjected to a uniformly directed magnetic field to induce a well defined magnetic anisotropy axis in each film element whereby substantially all of said film elements have their respective magnetic anisotropy axis oriented in substantially the same direction.

15. The method set forth in claim 13 wherein said deposited metallic material is selected from the group consisting of iron, nickel and alloys thereof.

16. The method set forth in claim 15 wherein said deposited metallic material is selected to have substantially zero magnetostriction.

17. The method set forth in claim 13 wherein said magnetic media is adapted for interaction with energy fields of a predetermined frequency in the frequency range of from approximately radio frequencies to approximately millimeter wavelengths, and wherein said metallic material is deposited under said controlled conditions to form thin film elements having a thickness dimension that is small compared to the skin depth at said predetermined frequency and major dimensions in the plane of said thin film layers that are much less than the corresponding wavelength of said energy fields at said predetermined frequency.

18. A magnetodielectric media adapted to be irradiated by electromagnetic energy having a predetermined frequency in the frequency range of from approximately radio frequencies to approximately millimeter wavelengths for interaction between said energy and said media comprising a plurality of macroscopic thin film elements of metallic material individually arranged in an array with adjacent elements in said array physically separated and electrically isolated from each other by dielectric media, and wherein said elements are in line in a first direction along said layer and in line in a second direction perpendicular to said first direction in said layer to form said orderly grid-like array in said layer.

19. A magnetodielectric media adapted to be irradiated by electromagnetic energy having a predetermined frequency in the frequency range of from approximately radio frequencies to approximately millimeter wavelengths for interaction between said energy and said media comprising a plurality of macroscopic thin film elements of metallic material individually arranged in an array with adjacent elements in said array physically separated and electrically isolated from each other by dielectric media, and wherein said elements each have a thickness dimension in a first direction and major dimensions in a plane generally perpendicular to said first direction and wherein said thickness dimension is small compared to the skin depth at said predetermined frequency and said major dimensions are much less than the corresponding wavelength at said predetermined frequency and each element has a parallelogram configuration in said plane and the longest side of said element is substantially less than said corresponding wavelength at said predetermined frequency.

20. The magnetodielectric media set forth in claim 19 wherein said predetermined frequency is in the range of approximately 10 mHz. to 100 gHz. each element has a generally rectangular configuration in said plane, said rectangular elements have a short side on the order of 0.020 inch and a long side on the order of 0.095 inch and wherein said dielectric separation between adjacent thin film elements in said plane is on the order of 0.005 inch.

21. A magnetodielectric media adapted to be irradiated by electromagnetic energy having a predetermined frequency in the frequency range of from approximately radio frequencies to approximately millimeter wavelengths for interaction between said energy and said media comprising a plurality of macroscopic thin film elements of metallic material individually arranged in an array with adjacent elements in said array physically separated and electrically isolated from each other by dielectric media, and wherein said thin film elements are arranged with a plurality of said elements in each of a plurality of different thin film layers and said thin film layers are stacked alternately with layers of dielectric media and wherein said thin film elements in each thin film layer are physically separated and electrically isolated from adjacent thin film elements in their respective layer by said dielectric media and from thin film elements in adjacent thin film layers by said layers of dielectric media, said thin film elements are coplanar in their respective layer of thin film elements, and said elements are in line in a first direction along their respective layers and in line in a second direction perpendicular to said first direction in their respective layers to form an orderly grid-like array in each thin film layer.

22. The magnetodielectric media set forth in claim 21 wherein said thin film elements are in line in a third direction perpendicular to their respective layers with corresponding elements in adjacent thin film layers to form stacks of thin film elements in said third direction.

23. The magnetodielectric media set forth in claim 22 wherein each of said elements has a hard magnetization axis oriented in said first direction and an easy magnetization axis oriented in said second direction, each stack of thin film elements has a corresponding hard axis demagnetization factor $D_v^h$, said magnetodielectric media has a film volume factor $V_f$ corresponding to the ratio of the total volume of thin film elements to the total volume of said magnetodielectric media and wherein for an intrinsic anisotropy field $H_k$ for a continuous film of said metallic material and a saturation magnetization $M_s$ for a continuous thin film of said metallic material said media is characterized by an effective saturation magnetization $M_s'$ and an effective anisotropy field $H_k'$ substantially satisfying the relationships $M_s'=V_fM_s$ and $H_k'=H_k+V_fD_v^hM_s$.

24. The magnetodielectric media set forth in claim 23 wherein each stack of said thin film elements has a corresponding easy axis demagnetization factor $D_v^e$ and wherein said media is further characterized by a hard axis demagnetizing field $H_d^h$ and an easy axis demagnetizing field $H_d^e$ substantially satisfying the relationships $H_d^h=V_fD_v^hM_s$ and $H_d^e=V_fD_v^eM_s$.

25. A magnetodielectric media adapted to be irradiated by electromagnetic energy having a predetermined frequency in the frequency range of from approximately radio frequencies to approximately millimeter wavelengths for interaction between said energy and said media comprising a plurality of macroscopic thin film elements of metallic material individually arranged in an array with adjacent elements in said array physically separated and electrically isolated from each other by dielectric media, and wherein said thin film elements are arranged with a plurality of said elements in each of a plurality of different thin film layers and said thin film layers are stacked alternately with layers of dielectric media and wherein said thin film elements in each thin film layer are physically separated and electrically isolated from adjacent thin film elements in their respective layer by said dielectric media and from thin film elements in adjacent thin film layers by said layers of dielectric media, said elements each have a thickness dimension in a first direction perpendicular to the plane of said layers and major dimensions in the plane of their respective layers and wherein said thickness dimension is small compared to the skin depth at said predetermined frequency and said major dimensions are much less than the corresponding wavelength at said predetermined frequency.

26. The magnetodielectric media set forth in claim 25 wherein each film element has a thickness dimension on the order of one thousand angstroms.

27. A magnetodielectric media adapted to be irradiated by electromagnetic energy having a predetermined frequency in the frequency range of from approximately radio frequencies to approximately millimeter wavelengths for interaction between said energy and said media comprising a plurality of macroscopic thin film elements of metallic material individually arranged in an array with adjacent elements in said array physically separated and electrically isolated from each other by dielectric media, and wherein said thin film elements are arranged with a plurality of said elements in each of a plurality of different thin film layers and said thin film layers are stacked alternately with layers of dielectric media and wherein said thin film elements in each thin film layer are physically separated and electrically isolated from adjacent thin film elements in their respective layer by said dielectric media and from thin film elements in adjacent thin film layers by said layers of dielectric media, said elements each have a thickness dimension in a first direction perpendicular to the plane of said layers and major dimensions in the plane of their respective layers, said thickness dimension is small compared to the skin depth at said predetermined frequency, said major dimensions are much less than the corresponding wavelength at said predetermined frequency, each element has a parallelogram configuration in said plane and the longest side of said element is substantially less than said corresponding wavelength at said predetermined frequency.

28. The magnetodielectric media set forth in claim 27 wherein said predetermined frequency is in the range of approximately 10 mHz. to 100 gHz., each element has a generally rectangular configuration in said plane of its respective layer, said rectangular elements have a short side on the order of 0.020 inch and a long side on the order of 0.095 inch and wherein said dielectric separation between adjacent thin film elements in said plane is on the order of 0.005 inch.

29. A magnetic laminate comprising a first plurality of thin metallic film layers and a second plurality of dielectric layers stacked alternately with said thin film layers, each thin film layer comprising a plurality of substantially identical thin film filaments physically separated and electrically isolated from adjacent elements in their respective layers and physically separated and electrically isolated from adjacent elements in adjacent thin film layers and wherein said elements each have the same orientation, said elements each have a uniaxial magnetic anisotropy axis and said elements are disposed in said array so that substantially all of said axes are oriented in substantially the same direction to provide an orderly array.

30. The laminate set forth in claim 29 wherein said thin film elements are metallic material selected from the group consisting of iron, nickel and alloys thereof.

31. The laminate set forth in claim 29 wherein said thin film elements have a thickness on the order of one thousand angstroms.

32. A magnetodielectric media adapted to interact inside said media with magnetic fields of a predetermined frequency comprising a plurality of thin film elements of metallic material arranged in a layer of dielectric material with adjacent elements in said layer physically separated from each other by said dielectric material, and wherein each of said elements has a uniaxial anisotropy axis and a preselected geometry, and said elements are arranged and disposed substantially coplanar in said layer at preselected positions in the plane of said layer with preselected separation from adjacent elements and with substantially all of said axes oriented in substantially the same direction to provide an ordered array.

33. The magnetodielectric media set forth in claim 32 wherein said elements each have a thickness dimension in a direction perpendicular to the plane of said layer and major dimensions in the plane of said layer and wherein said thickness dimension is small compared to the skin depth at said predetermined frequency and said major dimensions are much less than the corresponding wavelength at said predetermined frequency.

34. The magnetodielectric media set forth in claim 32 wherein said elements are positioned in line in a first direction along the plane of said layer and in line in a second direction perpendicular to said first direction.

35. The magnetodielectric media set forth in claim 32 wherein said elements are metallic material selected from the group consisting of iron, nickel and alloys thereof.

36. The magnetodielectric media set forth in claim 32 wherein said metallic material has substantially zero magnetostriction.

37. A magnetic laminate adapted to interact inside said laminate with energy fields comprising a first plurality of thin metallic film layers and a second plurality of dielectric layers stacked alternately with said thin film layers, each thin film layer comprising a plurality of thin film elements of metallic material arranged in dielectric material so that adjacent elements in each thin film layer are physically separated from each other by said dielectric material, and wherein each of said elements has a uniaxial magnetic anisotropy axis and a preselected geometry, and said elements are arranged and disposed substantially coplanar in said thin film layers at preselected positions in the plane of said thin film layers with preselected separation from adjacent elements and with substantially all of said axes of elements in a respective thin film layer oriented in substantially the same direction to provide an ordered array.

38. The magnetic laminate set forth in claim 37 wherein said laminate is adapted to interact inside said laminate with energy fields of a predetermined frequency, and wherein said elements each have a thickness dimension in a direction perpendicular to the plane of said layers and major dimensions in the plane of said thin film layers, and wherein said thickness dimension is small compared to the skin depth at said predetermined frequency and said major dimensions are much less than the corresponding wavelength at said predetermined frequency.

39. The magnetic laminate set forth in claim 37 wherein each of said elements has a hard magnetization axis oriented along a first direction in the planes of said thin film layers and an easy magnetization axis oriented along a second direction in the planes of said thin film layers, said thin film elements are stacked in a third direction perpendicular to the planes of said thin film layers, each stack of thin film elements has a corresponding hard axis demagnetizing factor $D_V^h$, said laminate has a film volume factor $V_f$ corresponding to the ratio of the total volume of thin film elements to the total volume of said laminate, and wherein for an intrinsic anisotropy field $H_k$ for a continuous film of said metallic material and a saturation magnetization $M_s$ for a continuous film of said metallic material said laminate is characterized by an effective saturation magnetization $M_s'$ and an effective anistropy field $H_k'$ substantially satisfying the relationships $$M_s' = V_f M_s$$

and $H_k + V_f D_V^h M_s$.

40. The magnetic laminate set forth in claim 37 wherein each stack of said thin film elements has a corresponding easy axis demagnetization factor $D_V^e$ and wherein said laminate is further characterized by a hard axis demagnetizing field $H_d^h$ and an easy axis demagnetizing field $H_d^e$ substantially satisfying the relationships $$H_d^h = V_f D_V^h M_s$$

and $H_d^e = V_f D_V^e M_s$.

References Cited

UNITED STATES PATENTS

| | | |
|---|---|---|
| 2,877,286 | 3/1959 | Vance et al. |
| 2,992,425 | 7/1961 | Pratt. |
| 2,992,426 | 7/1961 | Borcherdt. |
| 2,996,670 | 8/1961 | Pratt. |
| 3,007,160 | 10/1961 | Halpern. |
| 3,315,261 | 4/1967 | Wesch. |

RODNEY D. BENNETT, Primary Examiner

B. L. RIBANDO, Assistant Examiner